US012703948B2

(12) United States Patent
Kim et al.

(10) Patent No.: US 12,703,948 B2
(45) Date of Patent: Aug. 11, 2026

(54) CARRIER LIFT LOCKING STRUCTURE AND LOCKING METHOD TO PREVENT LIFT DEFLECTION DURING CARRIER MOVEMENT

(71) Applicant: MPLUS CORP., Cheongun-si (KR)

(72) Inventors: Jong Sung Kim, Seongnam-si (KR); Seong Moon Kim, Cheongju-si (KR)

(73) Assignee: MPLUS CORP., Cheongun-si (KR)

( * ) Notice: Subject to any disclaimer, the term of this patent is extended or adjusted under 35 U.S.C. 154(b) by 842 days.

(21) Appl. No.: 18/099,273

(22) Filed: Jan. 20, 2023

(65) Prior Publication Data

US 2024/0247443 A1 Jul. 25, 2024

(51) Int. Cl.

| | |
|---|---|
| ***E01B 7/00*** | (2006.01) |
| ***B66F 7/00*** | (2006.01) |
| ***E01B 7/20*** | (2006.01) |
| ***E01B 25/12*** | (2006.01) |

(52) U.S. Cl.

CPC .................. *E01B 7/00* (2013.01); *B66F 7/00* (2013.01); *E01B 7/20* (2013.01); *E01B 25/12* (2013.01)

(58) Field of Classification Search

CPC ... E01B 7/00; E01B 7/20; E01B 25/12; H01L 21/67775; H01L 21/67715; B66F 7/00

USPC ............................... 246/415 R; 104/128, 129

See application file for complete search history.

(56) References Cited

U.S. PATENT DOCUMENTS 3,783,792 A * 1/1974 Cullom .................... B66C 17/00 212/316
4,094,252 A * 6/1978 Pater ........................ E01B 25/12 246/115
4,207,821 A * 6/1980 Beckert .................... B60L 13/00 104/106
5,312,074 A * 5/1994 Keith ......................... E01B 7/20 104/130.05

(Continued)

FOREIGN PATENT DOCUMENTS

KR 10-1528006 A 6/2015
KR 10-2361748 B1 2/2022
KR 10-2438115 A 8/2022

*Primary Examiner* — S. Joseph Morano
*Assistant Examiner* — James William Jones

(57) ABSTRACT

The present disclosure is intended to provide a carrier moving lift locking structure, and the carrier moving lift locking structure includes a locking operation device provided at one lift rail (112) among two lift rails (112) that are adjacent to each other in a carrier moving lift (110) consisting of a plurality of lift rails (112); a lock shaft (130) coupled to the locking operation device; and a lock support block (140) provided at another lift rails (112) among the two lift rails (112) and into which the lock shaft (130) is inserted and coupled.

The present disclosure is configured to prevent a collision step difference between a first lift rails (112FL) and a second lift rails (112SL) of the carrier moving lift (110), thereby preventing a carrier (90) from colliding with the collision step difference when the carrier (90) moves over from the first lift rails (112FL) to the second lift rails (112SL), so that there is the effect of preventing the carrier (90) from being damaged due to an impact force of the collision during carrier movement, and the effect of significantly improving the lift of the carrier (90) by preventing damage to the carrier (90) due to a collision impact force during carrier movement.

17 Claims, 10 Drawing Sheets

(56) References Cited

U.S. PATENT DOCUMENTS

| | | | | |
|---|---|---|---|---|
| 7,584,704 | B2 * | 9/2009 | Schutte | B61B 15/00 104/128 |
| 7,913,627 | B2 * | 3/2011 | Shimizu | B65G 35/08 104/128 |
| 8,943,975 | B2 * | 2/2015 | Gmeinwieser | A63G 31/00 104/53 |
| 2014/0312180 | A1 * | 10/2014 | Bohme | B61L 5/026 246/415 R |

* cited by examiner

CARRIER LIFT LOCKING STRUCTURE AND LOCKING METHOD TO PREVENT LIFT DEFLECTION DURING CARRIER MOVEMENT

BACKGROUND OF THE INVENTION

Field of the Invention

The present disclosure relates to a carrier moving lift locking structure and a locking method to prevent lift deflection during carrier movement. More particularly, the present disclosure relates to a new type carrier lift locking structure and a locking structure to prevent lift deflection during carrier movement, from which several useful results such as preventing damage to a carrier due to an impact force of a collision when the carrier moves along a carrier moving lift can be expected.

Description of the Related Art

A secondary battery has a structure in which an electrode assembly is mounted to an inside portion of a battery casing, and an electrode tab protrudes on opposite ends or one end of the secondary battery.

During the manufacturing process of the secondary battery, a process for fusing combined electrode tabs in a state in which the electrode tabs protruding from multiple layers of electrode plates are overlapped is required, and in order to perform the process of fusing the electrode tabs, an electrode assembly is transferred to an electrode tab bonding device using a transport carrier, and multiple layers of the transferred electrode tabs in the electrode tab bonding device are bonded in a fusing method, thereby performing a process in which the electrode tabs protrude on the secondary battery. By using the electrode tab bonding device, multiple layers of positive electrode tabs and negative electrode tabs of the electrode assembly for the secondary battery are bonded by fusion or laser bonding.

Referring to FIG. 10, i.e. related art, when a carrier on a rail transfers a workpiece and performs work, the carrier on the rail moves for various objectives, and lines in which rails are connected to each other in a complex shape and transport the carrier to a destination are widely used in the equipment industry.

When the carrier moves from one rail to another rail for transfer, due to a clearance between the rails and rail deflection generated by the weight of the carrier and the workpiece, the clearance widens or a step difference is generated. When the carrier, which uses precise bearings, passes over to another rail, damage to a bearing often occurs due to impact of a collision with an edge of the rail due to the weight and speed. Accordingly, in order to repair the equipment for continuous manufacturing, the operation of the equipment must be stopped, which may cause a decrease in productivity.

Since the carrier is damaged in less than one year due to a collision during movement of the carrier, a method to significantly reduce damage to wheels and bearings of the carrier is required to solve the above problem.

DOCUMENTS OF RELATED ART

Korean Patent No. 10-2438115 (date of registration, Aug. 25, 2022)

Korean Patent No. 10-1528006 (date of registration, Jun. 4, 2015)

Korean Patent No. 10-2361748 (date of registration, Feb. 8, 2022)

SUMMARY OF THE INVENTION

The present disclosure is intended to provide a new type carrier moving lift locking structure, which is configured to prevent a wheel or a bearing of a carrier from colliding with an edge of a lift rail due to a step difference generated by deflection of the lift rail when the carrier moves along a carrier moving lift, thereby preventing the wheel or the bearing of the carrier from being damaged due to impact of a collision, and various useful results such as prolonging the life of the carrier can be expected.

According to the present disclosure for achieving the above-described objective, there is provided a carrier moving lift locking structure in a carrier moving lift including a plurality of first lift rails and a Z-axis rail lifter configured to lift and lower a second lift rail arranged to extend at each of left and right ends of each of the first lift rails, the carrier moving lift locking structure including: a locking operation device provided at each of left and right portions of each of opposite ends of each of upper and lower support frame members supporting the plurality of first lift rails among the two lift rails arranged adjacent to each other; a lock shaft coupled to the locking operation device; a lock support block provided at left and right portions of a moving support frame member, which is configured to support the second lift rail among the two lift rails, to be opposite to the locking operation device, such that the lock shaft is inserted thereinto.

The locking operation device may include a locking part and the lock support block, the locking part being arranged parallel to a longitudinal direction of the plurality of first lift rails and provided at each of left and right portions of opposite ends of each of the upper and lower support frame members supporting the plurality of first lift rails; and the locking part may include a locking operation cylinder supplying a driving force allowing reciprocating movement on a locking base bracket constituting a base of the locking part, a locking support bracket coupled to a piston rod of the locking operation cylinder, and the lock shaft coupled to the locking support bracket, and The lock support block may be arranged parallel to a longitudinal direction of the second lift rail, and simultaneously, be arranged at each of left and right portions of an end of the moving support frame member supporting the second lift rail to face the locking part, the end of the moving support frame member facing an end of each of the upper and lower support frame members.

A shaft inserting coupling tapered hole may be provided inside the lock support block by penetrating a front end of the lock support block, and as a piston rod of a locking operation cylinder moves forward and the lock shaft may be inserted into and coupled to the shaft inserting coupling tapered hole inside the lock support block and each of the plurality of first lift rails and the second lift rail may be firmly coupled to each other with the lock shaft and the lock support block that may be coupled to each other and thus occurrence of a height difference between each of the plurality of first lift rails and the second lift rail may be prevented, so that when a carrier moves over from each of the plurality of first lift rails toward the second lift rail or the carrier moves over from the second lift rail toward each of the plurality of first lift rails, a collision of the carrier with an end of the second lift rail or an end of each of the plurality of first lift rails may be prevented, thereby preventing damage to the carrier due to the collision.

The lock shaft may have an upper insertion guiding inclined surface and a lower insertion guiding inclined surface that may be provided at upper and lower surfaces of the lock shaft to be inclined inwardly toward a longitudinal center line when viewed from one side of the lock shaft, and the upper insertion guiding inclined surface and the lower insertion guiding inclined surface may extend toward a fore end of the lock shaft such that the lock shaft may be formed in a bar shape with an insertion guiding tapered shaft part at a front portion thereof, so that when a piston rod of a locking operation cylinder moves forward and the lock shaft may be inserted into and coupled to a shaft inserting coupling tapered hole inside the lock support block, the lock shaft may be smoothly inserted into the shaft inserting coupling tapered hole without getting caught at a fore end of the lock support block, by the insertion guiding tapered shaft part.

A shaft inserting coupling tapered hole inside the lock support block may have an upper tapered hole surface and a lower tapered hole surface that may extend toward a fore end of the lock support block and in which a gap between the upper tapered hole surface and the lower tapered hole surface may gradually widen such that the shaft inserting coupling tapered hole may be provided in a tapered hole that may widen to be inclined from the inside toward the fore end of the lock support block, and when a piston rod of a locking operation cylinder moves forward, an insertion guiding tapered shaft part of the lock shaft may enter smoothly the shaft inserting coupling tapered hole without getting caught by the lock support block.

Even when a height difference between each of the plurality of first lift rails and the second lift rail is generated, an upper tapered hole surface and a lower tapered hole surface of a shaft inserting coupling tapered hole may extend toward a fore end, and simultaneously, and there may be a farthest point of the upper tapered hole surface and the lower tapered hole surface such that a distance therebetween gradually widens, and the lock shaft may have an upper insertion guiding inclined surface and a lower insertion guiding inclined surface that may be provided at upper and lower surfaces of the lock shaft and may be inwardly inclined toward a longitudinal center line when viewed from one side of the lock shaft, and the upper insertion guiding inclined surface and the lower insertion guiding inclined surface may extend to a fore end of the lock shaft, and a vertical gap (G) between the farthest point of the upper tapered hole surface and the lower tapered hole surface and a narrowest point constituting an insertion guiding tapered shaft part at a front portion of the lock shaft may be formed larger than a permissible deflection amount that can occur, so that each of the plurality of first lift rails and the second lift rail may be easily coupled to each other while correcting a dislocated vertical step difference.

The lock shaft may have a side tapered surface formed on at least one side surface among left and right side surfaces and the side tapered surface may be formed to be inwardly inclined toward a longitudinal center line of the lock shaft when viewed from above the lock shaft, and the lock shaft may consist of an inclined surface extending to a fore end of the lock shaft, and when a piston rod of a locking operation cylinder moves forward and the lock shaft is inserted into and coupled to a shaft inserting coupling tapered hole inside the lock support block, the lock shaft smoothly may enters the shaft inserting coupling tapered hole without getting caught at a fore end of the lock support block, by guiding of the side tapered surface.

Even when a transverse step difference occurs between each of the plurality of first lift rails and the second lift rail, a gap (G1) between a wide end of a side tapered hole surface of a shaft inserting coupling tapered hole and a narrow end of a side tapered surface of an insertion guiding tapered shaft part may be formed so that coupling may be smoothly performed while correcting the dislocated transverse step difference.

When a carrier moves over from each of the plurality of first lift rails toward the second lift rail, even when the locking operation device is operated, the height of the second lift rail may be relatively lowered than the height of each of the plurality of first lift rails, so that when the carrier moves over from each of the plurality of first lift rails toward the second lift rail, a collision of the carrier with an end of the second lift rail may be prevented, which may occur by falling of the carrier due to a distance that widens due to a clearance between each of the plurality of first lift rails and the second lift rail, thereby preventing the carrier from being damaged by the collision, and when the carrier moves over from the second lift rail toward each of the plurality of first lift rails, the height of each of the plurality of first lift rails may be relatively lower than the height of the second lift rail, so that when the carrier moves over from the second lift rail toward each of the plurality of first lift rails, a collision of the carrier with an end of each of the plurality of first lift rails may be prevented, which may occur by falling of the carrier due to a distance that widens due to the clearance between each of the plurality of first lift rails and the second lift rail, thereby preventing the carrier from being damaged by the collision.

According to the present disclosure, there is provided a locking method to prevent carrier moving lift deflection, the locking method being provided in a carrier moving lift consisting of a plurality of first lift rails and a Z-axis rail lifter configured to lift and lower a second lift rail arranged to extend at each of left and right ends of each of the plurality of first lift rails, and a locking operation device that may be provided at each of left and right portions of each of opposite ends of each of upper and lower support frame members supporting the plurality of first lift rails, among the two lift rails that may be arranged adjacent to each other, may allow a lock shaft coupled to the locking operation device to move forward, and the lock shaft may be inserted into a lock support block, the lock support block being provided at each of left and right portions of a moving support frame member supporting the second lift rail, from or to which the carrier may move over, to face the locking operation device such that the lock shaft may be inserted and coupled thereto, and in a state in which the lock shaft and the lock support block are coupled to each other, each of the plurality of first lift rails and the second lift rail may be firmly coupled to each other to correct a height difference between each of the first lift rails and the second lift rail, so that when the carrier moves over from each of the first lift rails toward the second lift rail and from the second lift rail toward each of the first lift rails, damage to the carrier due to a collision with ends of each of the first lift rails and the second lift rail may be prevented.

The carrier moving lift locking structure according to the present disclosure is configured to prevent the step difference that causes a collision due to deflection between the first lift rail and the second lift rail of the carrier moving lift, so that when the carrier moves from the first lift rail to the second lift rail or from the second lift rail to the first lift rail, a collision of the carrier due to the collision step difference is prevented. Therefore, damage to the carrier due to an impact of a collision during movement is prevented, so that there is the effect of preventing damage occurring by a collision impact during movement of the carrier, and the effect of significantly improving the life of the carrier can be expected. In other words, according to the present disclosure, the carrier can be prevented from being damaged due to a collision impact when the carrier moves along the carrier moving lift, and the life of the carrier can significantly extend by the prevention of collision impact of the carrier.

DETAILED DESCRIPTION OF THE INVENTION

Hereinbelow, an exemplary embodiment of the present disclosure will be described in detail with reference to accompanying drawings. The above objective, features, and other advantages of the present disclosure will be more clearly understood from the following detailed description and the accompanying drawings. Furthermore, in the following description, if it is decided that the detailed description of known function or configuration related to the present disclosure makes the subject matter of the invention unclear, the detailed description is omitted.

Furthermore, when describing the components of the present disclosure, terms such as first, second, A, B, (a), (b), etc. may be used. Since these terms are provided merely for the purpose of distinguishing the components from each other, they do not limit the nature, sequence or order of the components. It will be understood that when an element is referred to as being "coupled" or "connected" to another component, it can be directly coupled or connected to the other component or intervening components may be present therebetween.

Furthermore, specific structural and functional descriptions of embodiments of the present disclosure disclosed herein are only for illustrative purposes of the embodiments of the present invention, and the embodiments according to the concept of the present disclosure may be embodied in many different forms and should not be construed as limiting the embodiments described in the description or the present disclosure.

Figure 1:
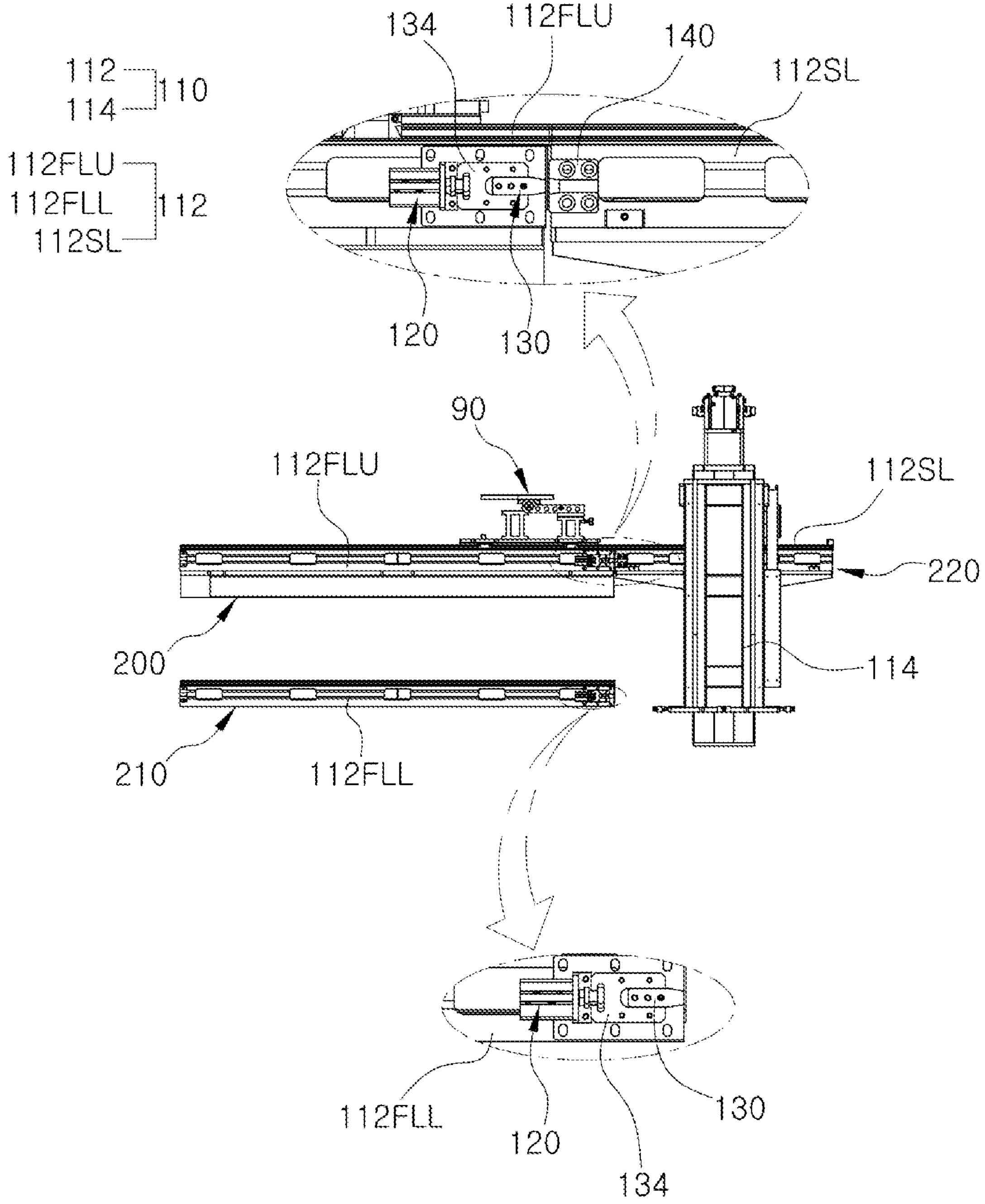
FIG. 1 is a front view showing a carrier moving lift locking structure and a carrier moving lift according to the present disclosure.
Figure 2:
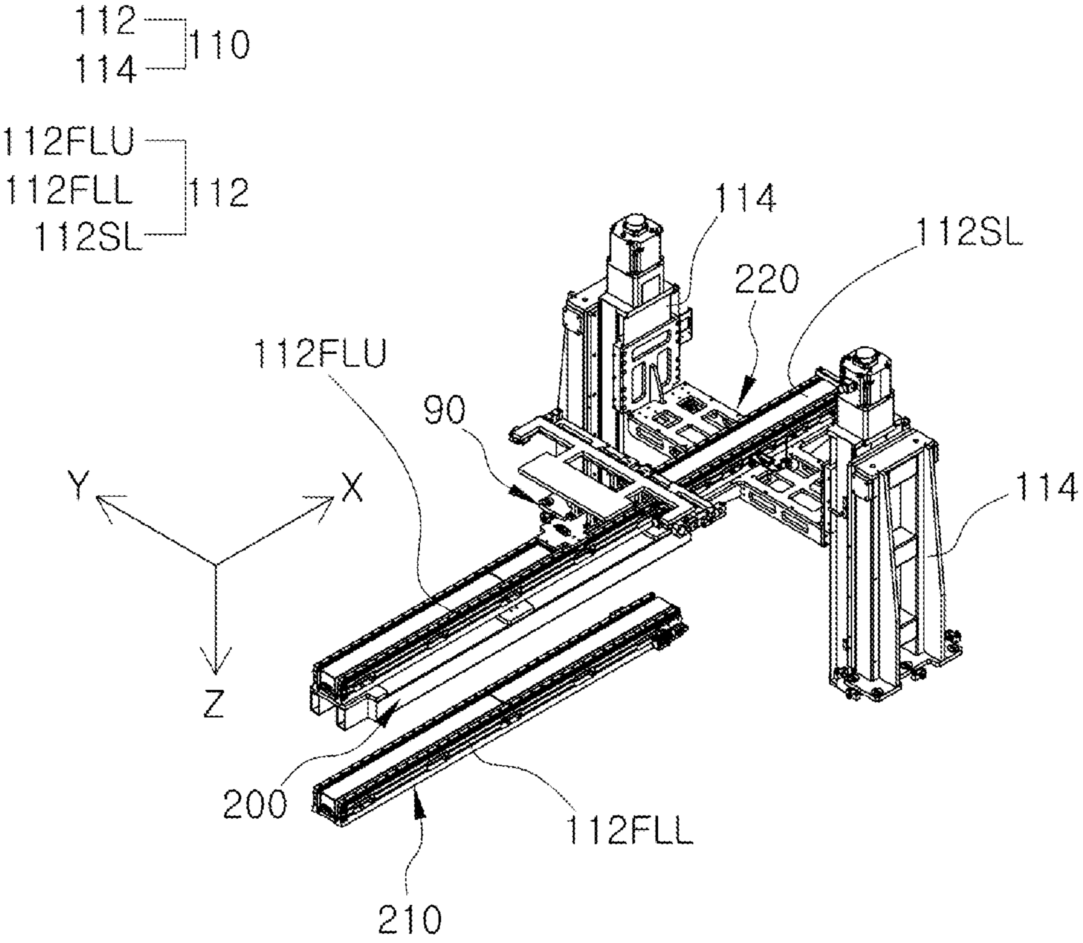
FIG. 2 is a perspective view showing a carrier and the carrier moving lift shown in FIG. 1.
Figure 3:
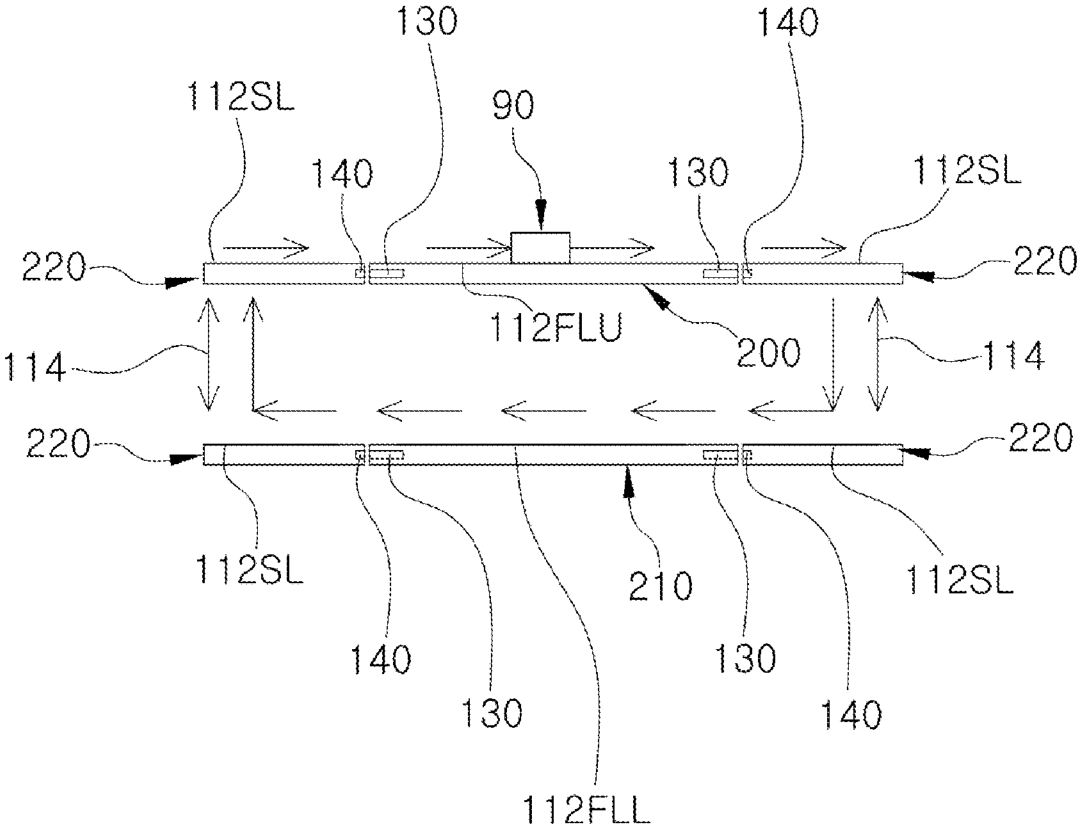
FIG. 3 is a schematic view showing a moving path of the carrier according to the present disclosure.
Figure 4:
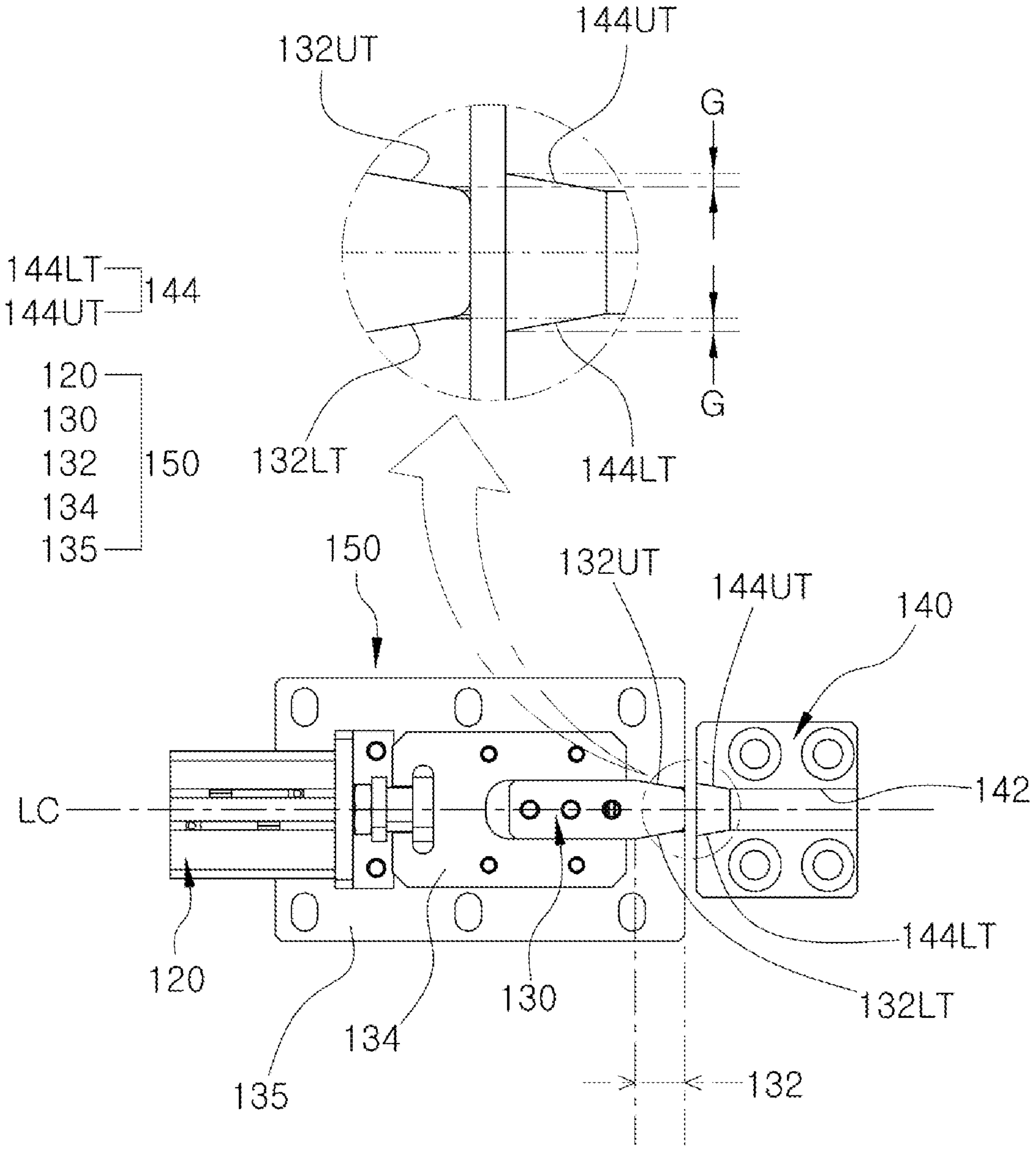
FIG. 4 is a front view showing the carrier moving lift locking structure according to the present disclosure.
Figure 5:
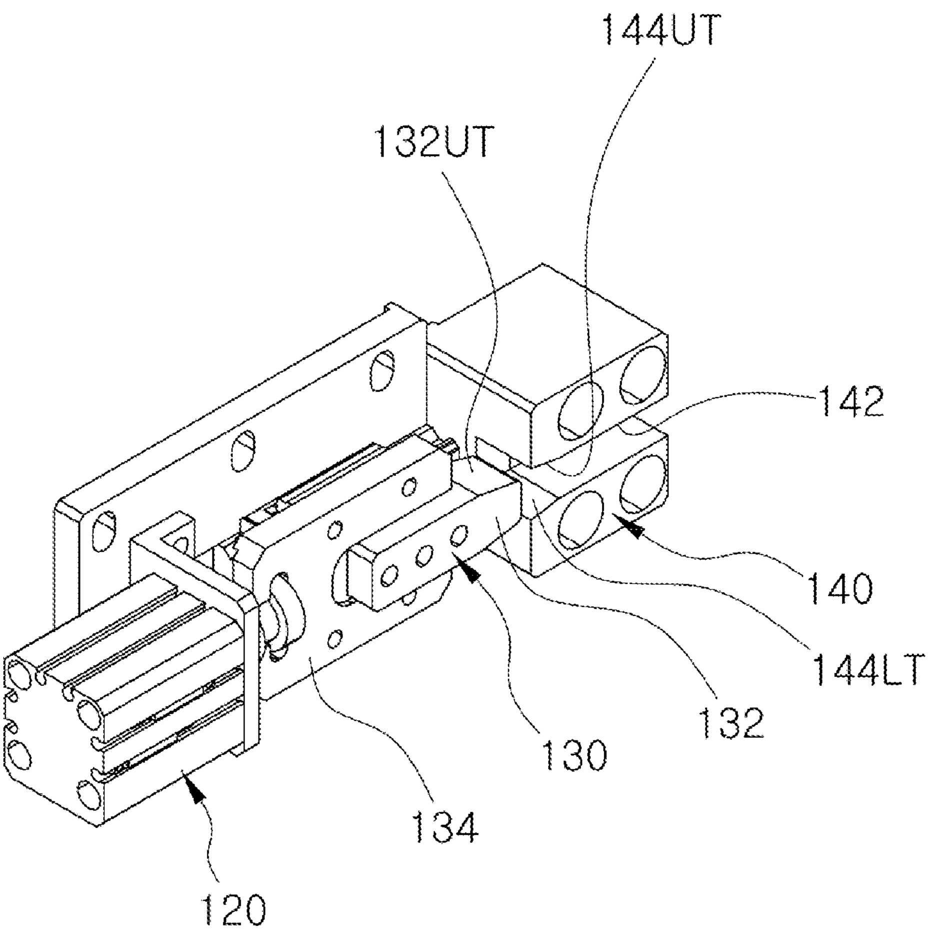
FIG. 5 is a perspective view showing the carrier moving lift locking structure according to the present disclosure.
Figure 6:
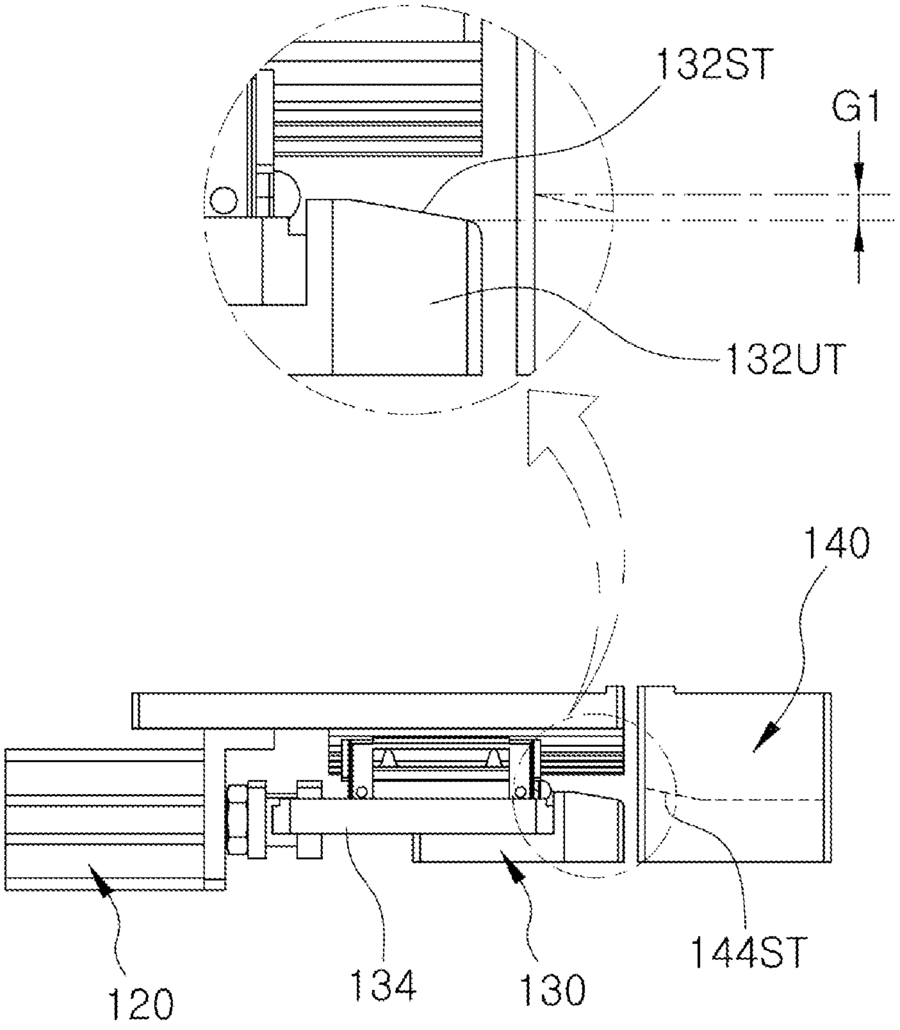
FIG. 6 is a plan view of FIG. 5.
Figure 7:
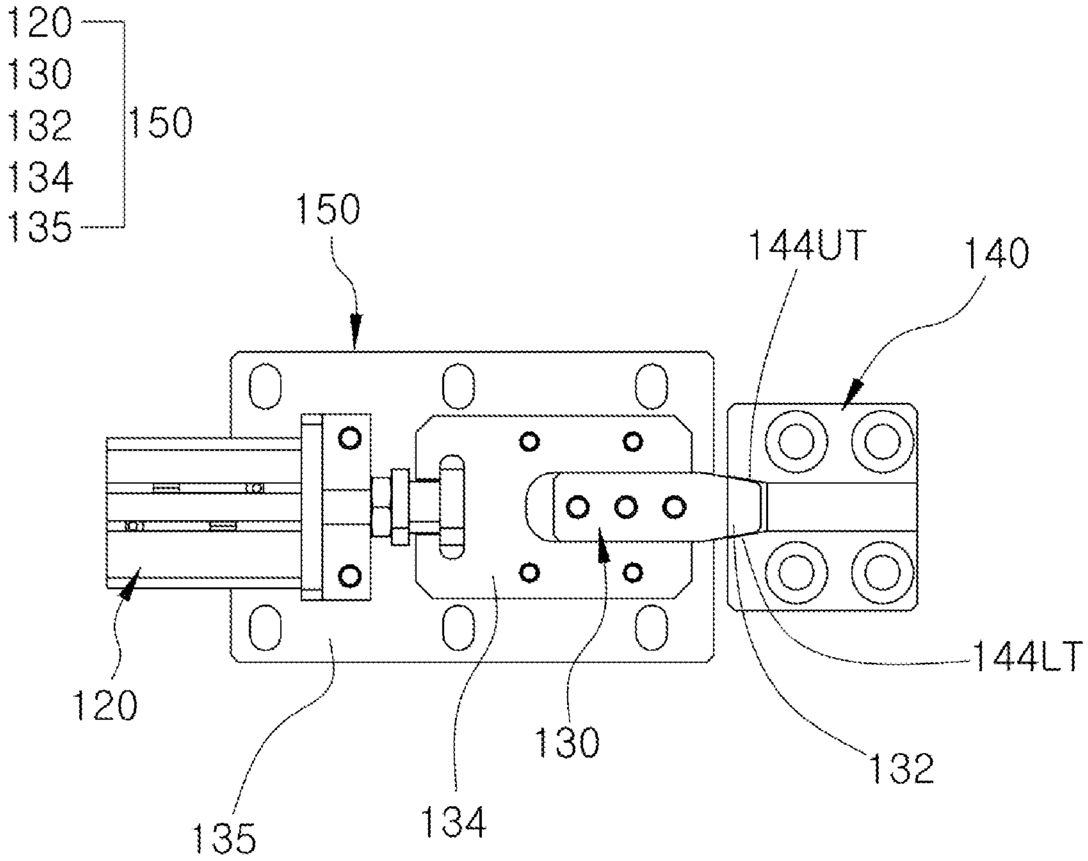
FIG. 7 is a front view showing a state in which a lock shaft that is a main part of the present disclosure is inserted into and coupled to a lock support block.
Figure 8:
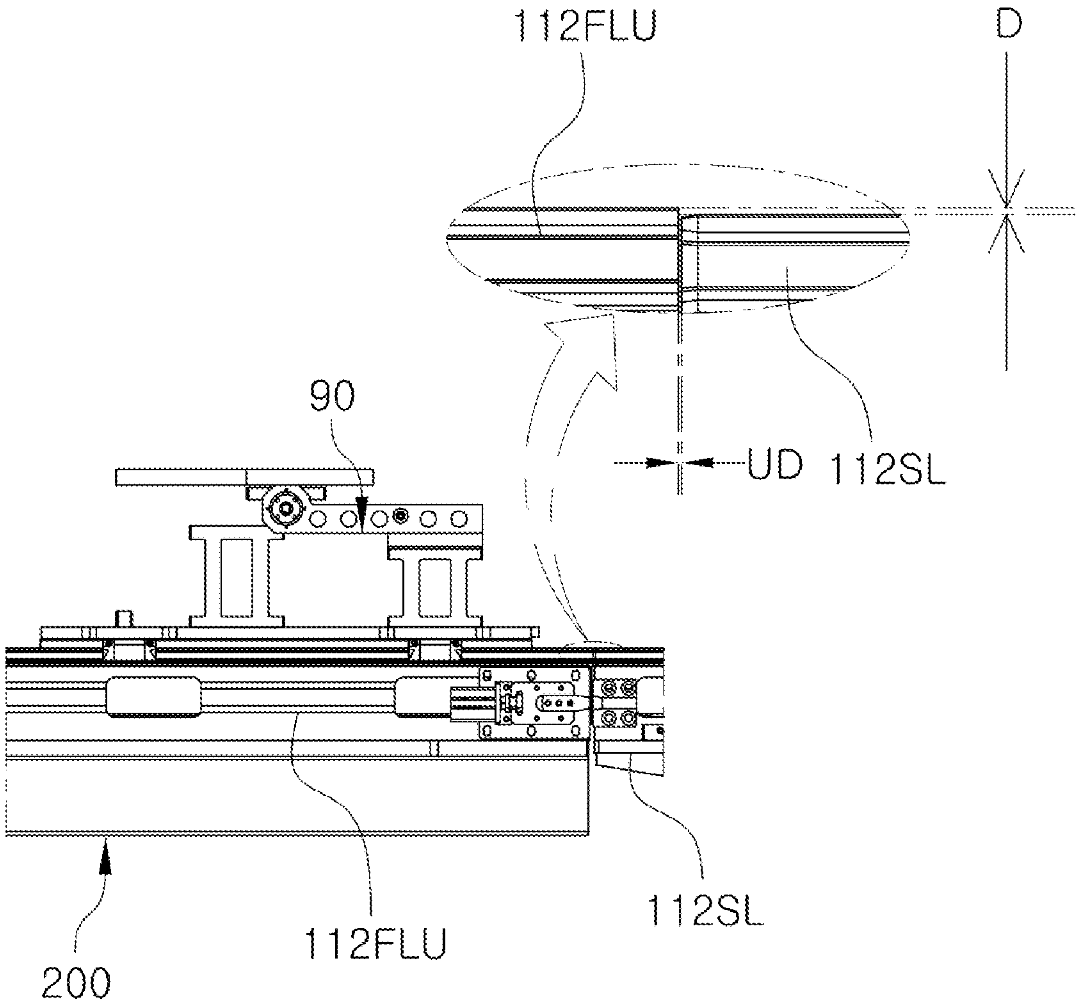
FIG. 8 is an embodiment in which a height difference is formed between a first lift rail and a second lift rail to prevent a collision of the carrier when the carrier moves over from the first lift rail toward the second lift rail to which the carrier moving lift locking structure of the present disclosure is provided.
Figure 9:
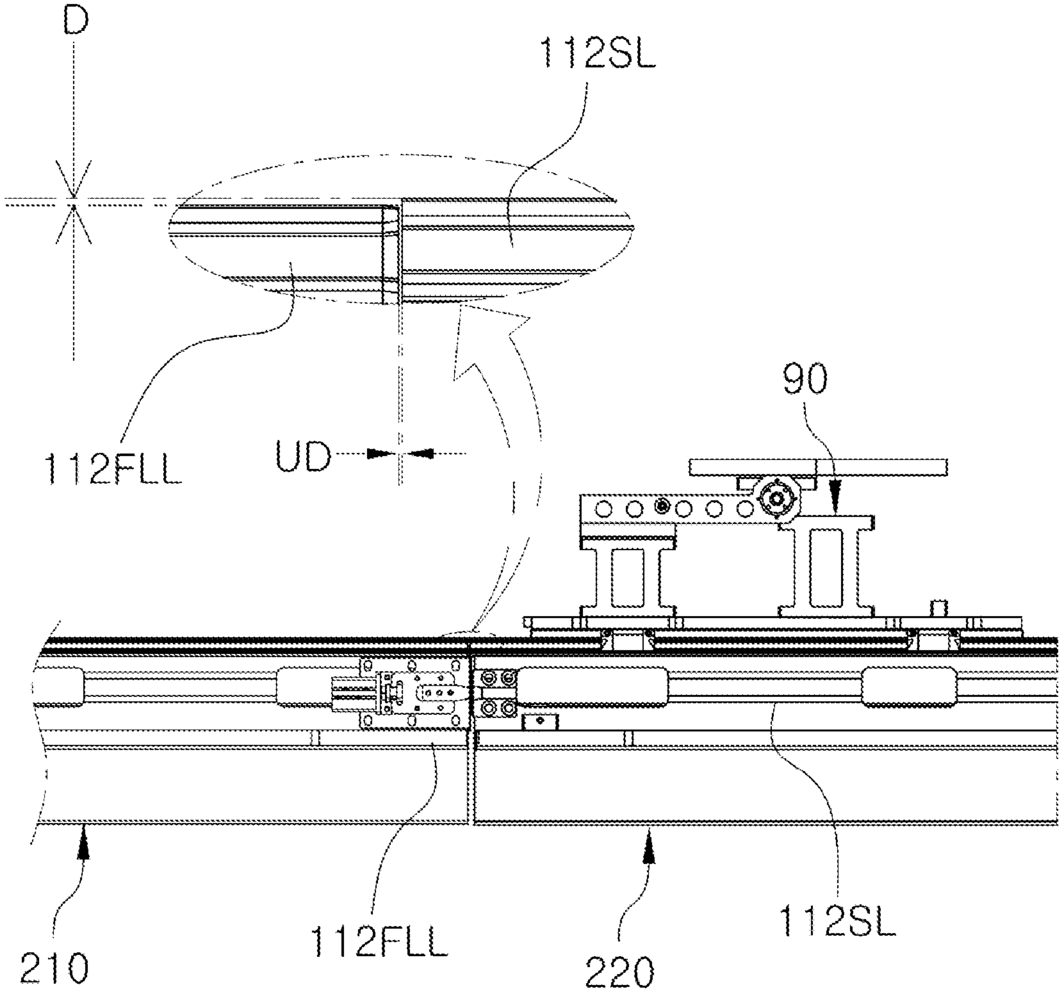
FIG. 9 is a front view showing an embodiment in which a height difference is formed between the first lift rail and the second lift rail to prevent a collision of the carrier occurring when the carrier moves from the second lift rail toward the first lift rail to which the carrier moving lift locking structure of the present disclosure is provided.
Figure 10:
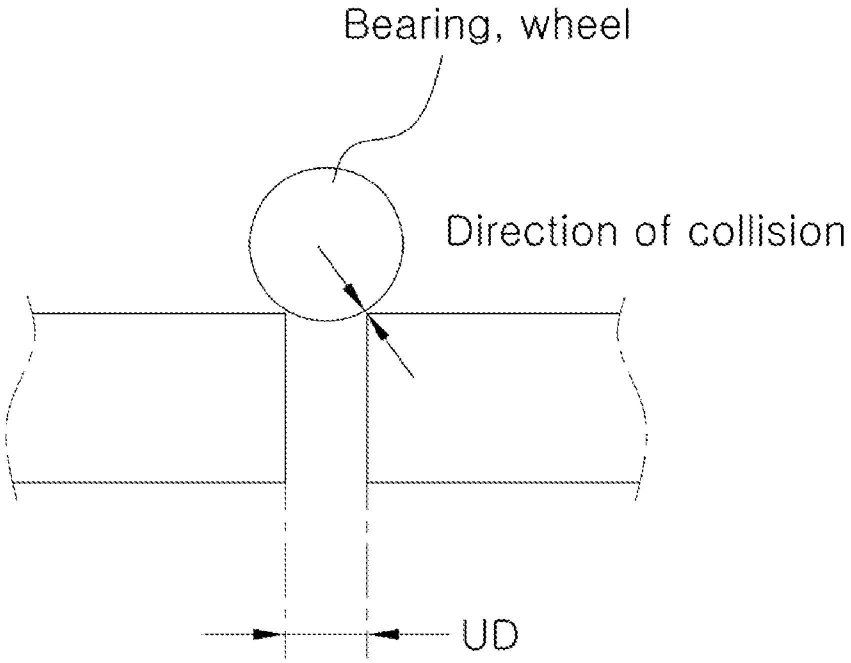
FIG. 10 is a schematic view showing a problem of the related art.

FIG. 1 is a front view showing a carrier moving lift locking structure and a carrier moving lift according to the present disclosure. FIG. 2 is a perspective view showing a carrier and the carrier moving lift shown in FIG. 1. FIG. 3 is a schematic view showing a moving path of the carrier according to the present disclosure. FIG. 4 is a front view showing the carrier moving lift locking structure according to the present disclosure. FIG. 5 is a perspective view showing the carrier moving lift locking structure according to the present disclosure. FIG. 6 is a plan view of FIG. 5. FIG. 7 is a front view showing a state in which a lock shaft that is a main part of the present disclosure is inserted into and coupled to a lock support block. FIG. 8 is an embodiment in which a height difference is formed between a first lift rail and a second lift rail to prevent a collision of the carrier when the carrier moves over from the first lift rail toward the second lift rail to which the carrier moving lift locking structure of the present disclosure is provided. FIG. 9 is a front view showing an embodiment in which a height difference is formed between the first lift rail and the second lift rail to prevent a collision of the carrier occurring when the carrier moves from the second lift rail toward the first lift rail to which the carrier moving lift locking structure of the present disclosure is provided. FIG. 10 is a schematic view showing a problem of the related art.

Meanwhile, explaining the problem again, in a secondary battery manufacturing process, there is a process in which at least two Z-axis rail lifters 114 are configured to lift and lower a second lift rail 112SL at left and right sides so that the second lift rail 112SL is connected to a first lift upper rail 112FLU and a first lift lower rail 112FLL, thereby moving a carrier along a connected circulation type lift rail 112 (referring to FIGS. 1 and 3).

Looking at the degree of stiffness of structures performing the process, in the first lift upper rail 112FLU and the first lift lower rail 112FLL, the regulated structures supporting the rails are strong, and there is no deflection or a very slight deflection due to the weight of the carrier and a workpiece. However, the structure in which a Z-axis rail lifters 114 move the second lift rail 112SL vertically with the loaded carrier has the stiffness vulnerable to deflection, and the amount of deflection may change depending on a position of the carrier or the weight of the workpiece, so the objective of the present disclosure is to seek a method of reducing or eliminating damage to a wheel or a bearing of the carrier during a collision due to a step difference between the rails, the step difference being generated by the amount of deflection of the lift rail 112.

As shown in FIG. 3, a moving path of the carrier is configured such that a plurality of horizontal second lift rails 112SL is arranged in a row at the left and right of each of the first lift rails to be connected to the first lift upper rail 112FLU and the first lift lower rail 112FLL, so that the carrier is circulated along the first lift upper rail 112FLU and the first lift lower rail 112FLL.

However, among the lift rails 112 (112FLU, 112FLL, 112SL) continuously arranged to form the first lift upper rail 112FLU and the first lift lower rail 112FLL (hereinbelow, which are collectively referred to as the lift rail 122FL for convenience of description), a clearance UD is generated between two adjacent lift rails 112, i.e. the first lift upper rail 112FLU and the second lift rail 112SL or the first lift lower rail 112FLL and the second lift rail 112SL, and a height difference is generated between the adjacent two lift rails 112 due to the weight of the carrier and the clearance UD, so a height difference is generated between the first lift rail 112FL and the second lift rail 112SL for the carrier to move from the first lift rail 112FL and the second lift rail 112S and vice versa.

Specifically, when the carrier moves over from the second lift rail 112SL to the first lift rail 112FL, the height of the second lift rail 112SL is lowered to a lower position than the height of the first lift rail 112FL due to the weight of the carrier. Accordingly, a collision step difference between the first lift rail 112FL and the second lift rail 112SL is generated, and the collision step difference is generated at an edge of the first lift rail 112FL.

Furthermore, when the carrier moves from the first lift rail 112FL to the second lift rail 112SL and the height of the second lift rail 112SL is higher than the height of the first lift rail 112FL, i.e. when a first carrier is located at the right of the Z-axis rail lifters 114 in FIG. 1 and a second carrier 90 is moves to the second lift rail 112SL, the entrance of the second lift rail 112SL is located higher than the height of the first lift rail 112FL due to the weight of the first carrier, and the collision step difference is generated between the first lift rail 112FL and the second lift rail 112SL, and the collision step difference is generated at an edge of the second lift rail 112SL.

Therefore, in a process in which the carrier moves from the first lift rail 112FL to the second lift rail 112SL, the carrier collides with the end of the second lift rail 112SL, or in a process in which the carrier moves from the second lift rail 112SL to the first lift rail 112FL, the carrier collides with the end of the first lift rail 112FL, causing a problem in that the carrier is damaged due to the collision during moving of the carrier. The present disclosure is to provide a solution to the problem in that the carrier is damaged in less than one year due to a collision during moving of the carrier.

Referring to the drawings, the carrier moving lift locking structure of the present disclosure, in a carrier moving lift 110 consisting of a plurality of first lift rails 112FL and the Z-axis rail lifters 114 configured to lift and lower the second lift rail 112SL arranged to extend at each of the opposite ends of each of the first lift rails 112FL, includes:

a locking operation device 300 provided at each of left and right portions of each of opposite ends of each of upper and lower support frame members 200 and 210 supporting the first lift rail 112FL among the two lift rails 112FL and 112SL that are arranged to be adjacent to each other;

a lock shaft 130 coupled to the locking operation device; and a lock support block 140 provided at each of left and right portions of a moving support frame member 220 supporting the second lift rail 112SL among the two lift rails 112FL and 112SL to be opposite to the locking operation device and for the lock shaft 130 to be inserted and coupled thereto.

As shown in the present disclosure, the plurality of first lift rails 112FL of the carrier moving lift 110 includes the second lift rail 112SL arranged in parallel to an X-axis direction and the Z-axis rail lifters 114 arranged to move the second lift rail 112SL vertically. FIGS. 1 and 2 are the views showing the half of the rails formed symmetrically, and at the upper side, the second lift rail 112SL is arranged at each of the left and right portions of the first lift rail 112FLU, and at the lower side, the second lift rail 112SL located at the upper side will move and be arranged at each of the left and right portions of the single first lift rail 112FLL, and the Z-axis rail lifters 114 moving the second lift rail 112SL vertically are arranged at opposite portions of the second lift rail 112SL.

The carrier 90 is configured to move by being circulated clockwise, i.e. an arrow direction (referring to FIG. 3) along the lift rail 112.

The lock shaft 130 is provided such that four locking parts 150 are provided at left and right surfaces of the opposite ends of each of the upper and lower support frame members 200 and 210 respectively supporting the first lift upper rail 112FLU and the first lift lower rail 112FLL. The lock shaft 130 has a structure in which a locking base bracket 135 constituting the locking part 150 is coupled to each of the left and right surfaces of each of the opposite ends of each of the upper and lower support frame members 200 and 210 by in a piece-coupling manner, and the lock shaft 130 is arranged on the locking base bracket 135 (referring to FIG. 3).

Hereinbelow, for the convenience of description, among the two adjacent X-axis lift rails 112, one X-axis lift rail 112 is referred to as the first lift rail 112FL, and describing by subdivision, the first lift rail 112FL is divided into the first lift upper rail 112FLU and the first lift lower rail 112FLL, and the other X-axis lift rail 112 is referred to as the second lift rail 112SL.

In the present disclosure, as shown in FIGS. 1 and 2, the locking base bracket 135, i.e. a base of the locking part 150, is provided at each of the opposite surfaces of the upper support frame member 200 supporting the first lift rail 112FL. A locking support bracket 134 is mounted on the locking base bracket 135, and a locking operation cylinder 120 is coupled to the locking support bracket 134 to move the locking support bracket 134 leftward and rightward. A piston rod of the locking operation cylinder 120 is arranged in a direction parallel to the rails of the carrier moving lift 110. In other words, the piston rod of the locking operation cylinder 120 is arranged in parallel to the X-axis. In other words, in the present disclosure, the locking base bracket 135, which is the base of the locking part 150, is provided on each of the opposite surfaces of an end of the upper support frame member 200 supporting the first lift rail 112FL, the locking support bracket 134 is mounted on the locking base bracket 135, and the locking operation cylinder 120 is mounted to the locking support bracket 134. Therefore, the locking operation cylinder 120 reciprocates to operate the lock shaft 130 to lock and release the lock shaft 130.

The locking base bracket 135, which is the base of the locking part 150, is provided on each of the opposite surfaces of the end of the upper support frame member 200 supporting the first lift rail 112FL, and the locking operation cylinder 120 is arranged on the locking base bracket 135 in parallel to a longitudinal direction of the first lift rail 112FL.

As shown in FIGS. 4 and 5, the lock shaft 130 is coupled to the piston rod of the locking operation cylinder 120.

In the present disclosure, the locking base bracket 135, which is the base of the locking part 150, is provided on each of the opposite surfaces of the end of the upper support frame member 200 supporting the first lift rail 112FL via a linear guide, and the locking support bracket 134 is mounted on the locking base bracket 135, the locking support bracket 134 is connected to the piston rod of the locking operation cylinder 120, and the lock shaft 130 is coupled to the locking support bracket 134. Therefore, the lock shaft 130 is coupled to the piston rod of the locking operation cylinder 120 to move the lock shaft 130 leftward and rightward to perform locking and unlocking.

At this point, the lock shaft 130 includes an upper insertion guiding inclined surface 132UT and a lower insertion guiding inclined surface 132LT that are inwardly inclined on a part of an upper surface and a part of a lower surface thereof. The upper insertion guiding inclined surface 132UT and the lower insertion guiding inclined surface 132LT are formed to be inwardly inclined toward a longitudinal center line of the lock shaft 130. As shown in FIG. 4, when viewed from the outside of the lock shaft 130, the upper insertion guiding inclined surface 132UT is formed to be downwardly inclined toward the longitudinal center line of the lock shaft 130, and the lower insertion guiding inclined surface 132LT is formed to be upwardly inclined toward the longitudinal center line of the lock shaft 130. The upper insertion guiding inclined surface 132UT and the lower insertion guiding inclined surface 132LT extend to a fore end of the lock shaft 130.

The upper insertion guiding inclined surface 132UT and the lower insertion guiding inclined surface 132LT allow the lock shaft 130 to have a structure with an insertion guiding tapered shaft part 132 that extends from the fore end to a base end by a predetermined distance.

Looking at an enlarged portion in FIG. 4, a gap between a low point of the upper insertion guiding inclined surface 132UT and a high point of an upper tapered hole surface 144UT is indicated by a gap G, and a gap between a high point of the lower insertion guiding inclined surface 132LT and a lower point of a lower tapered hole surface 144LT is also indicated by a gap G. The gaps G are designed to be wider than a height difference (step difference) generated due to deflection generated by the weight between the first guide rail 112FL and the second guide rail 112SL. Accordingly, the insertion guiding tapered shaft part 132, which is the fore end of the lock shaft 130, is inserted into a shaft inserting coupling tapered hole 144 of the lock support block 140 to accommodate the step difference generated between the first guide rail 112FL and the second guide rail 112SL and to eliminate the step difference between the first guide rail 112FL and the second guide rail 112SL, so that reduction or eliminating of impact that may be applied to a wheel or a bearing of the carrier 90 is performed.

Meanwhile, as shown in FIG. 6, the lock shaft 130 includes a side tapered surface 132ST on at least the inner surface among the inner and outer surfaces thereof. The side tapered surface 132ST is configured to be connected from the width center line side between the fore end and the base end of the lock shaft 130 to the fore end of the lock shaft 130.

Eventually, in the present disclosure, the lock shaft 130 has a structure of providing the side tapered surface 132ST to the insertion guiding tapered shaft part 132, and the lock support block 140 includes a side tapered hole surface 144ST therein to correspond to the side tapered surface 132ST of the insertion guiding tapered shaft part 132.

The locking part 150 is provided on each of the opposite surfaces of the end of each of the upper and lower support frame members 200 and 210 supporting the first lift rail 112FL, and the lock support block 140 is provided on each of the opposite surfaces of the end of the moving support frame member 220 supporting the second lift rail 112SL to correspond to the locking part 150. Accordingly, a Y-axis step difference between the first lift rail 112FL and the second lift rail 112SL can be corrected by the interaction of the side tapered surface 132ST and the side tapered hole surface 144ST.

In FIG. 6, a gap between a low point of the side tapered surface 132ST and a high point of the side tapered hole surface 144ST is indicated by a gap G1, and the gap G1 is designed wider than the Y-axis difference (step difference) that may be generated between the first guide rail 112FL and the second guide rail 112SL, and the insertion guiding tapered shaft part 132 of the fore end of the lock shaft 130 is inserted into the shaft inserting coupling tapered hole 144 of the lock support block 140 to accommodate the Y-axis step difference generated between the first guide rail 112FL and the second guide rail 112SL and to eliminate the step difference between the first guide rail 112FL and the second guide rail 112SL, thereby acting reduction or elimination of shock that may be applied to a wheel or a bearing of the carrier 90.

As shown in FIGS. 5 and 6, the lock support block 140 is provided at the second lift rail 112SL among the two adjacent first lift rail 112FL and the second lift rail 112SL.

The lock support block 140 includes an inserting hole 142 therein, and the inserting hole 142 is formed by penetrating a fore end of the lock support block 140.

The inserting hole 142 may be formed by penetrating the lock support block 140 toward a base end of the lock support block 140. The inserting hole 142 may be also formed by penetrating a front surface side of the lock support block 140.

Furthermore, the shaft inserting coupling tapered hole 144 is provided in a part of the inserting hole 142 of the lock support block 140.

The shaft inserting coupling tapered hole 144 is formed into a tapered hole shape in which a distance gradually increases in a direction from a position of the width center line between the fore end and the base end of the lock support block 140 toward the fore end of the lock support block 140.

According to the present disclosure, the lock support block 140 is arranged parallel to a longitudinal direction of the second lift rail 112SL and is provided on each of the opposite surfaces of the end of the moving support frame member 220 supporting the second lift rail 112SL to correspond to the locking part 150, and the shaft inserting coupling tapered hole 144 is provided inside the lock support block 140. Therefore, as piston rod of the locking operation cylinder 120 moves forward, the lock shaft 130 is inserted into and coupled to the shaft inserting coupling tapered hole 144 inside the lock support block 140 (referring to FIG. 6).

As described above, with the inserted-coupled state between the lock shaft 130 and the lock support block 140, the first lift rail 112FL and the second lift rail 112SL are firmly coupled to each other to improve the stiffness so that deflection between the first lift rail 112FL and the second lift rail 112SL due to the weight of the carrier 90 and workpiece is prevented, and a height difference between the first lift rail 112FL and the second lift rail 112SL is not generated, thereby preventing a collision.

Therefore, when the carrier 90 moves from the first lift rail 112FL to the second lift rail 112SL or from the second lift rail 112SL to the first lift rail 112FL, a collision of the carrier 90 with an end of the first lift rail 112FL or the second lift rail 112SL is prevented, so that an effect of preventing damage of the carrier 90 due to a collision can be expected.

When viewed from one side of the lock shaft 130, the lock shaft 130 includes the upper insertion guiding inclined surface 132UT and the lower insertion guiding inclined surface 132LT that are inwardly inclined toward the longitudinal center line thereof on the upper and lower surfaces thereof. The upper insertion guiding inclined surface 132UT and the lower insertion guiding inclined surface 132LT are connected to the fore end of the lock shaft 130 to be formed into a bar shape in which the lock shaft 130 includes the insertion guiding tapered shaft part 132 at a front portion thereof.

Therefore, as the piston rod of the locking operation cylinder 120 moves forward, when the lock shaft 130 moves forward into the shaft inserting coupling tapered hole 144 inside the lock support block 140, the insertion guiding tapered shaft part 132 allows the lock shaft 130 to enter smoothly the shaft inserting coupling tapered hole 144 without getting caught by the lock support block 140. There is the effect of preventing the lock shaft 130 from getting caught by the fore end of the lock support block 140 and completely entering the lock support block 140 when the lock shaft 130 moves forward and enter the lock support block 140.

Furthermore, the upper tapered hole surface 144UT and the lower tapered hole surface 144LT of the shaft inserting coupling tapered hole 144 inside the lock support block 140 are connected to the fore end of the lock support block 140 and a distance therebetween gradually widens to be formed in the tapered hole shape.

Therefore, as the piston rod of the locking operation cylinder 120 moves forward, the insertion guiding tapered shaft part 132 of the lock shaft 130 can smoothly enter the shaft inserting coupling tapered hole 144 without getting caught the fore end of the lock support block 140, and the height difference between the first lift rail 112FL and the second lift rail 112SL is accommodated by the interaction between the insertion guiding tapered shaft part 132 and the shaft inserting coupling tapered hole 144 to correct the heights such that the heights of the first lift rail 112FL and the second lift rail 112SL are equal to each other. Accordingly, the height difference between the first lift rail 112FL and the second lift rail 112SL are not generated, causing the effect of preventing a collision.

Explaining again, with the gap G between a wide portion of the entrance of the upper tapered hole surface 144UT of the lock support block 140 coupled to each of the opposite surfaces of the moving support frame member 220 and a narrow portion of the upper insertion guiding inclined surface 132UT of the lock shaft 130 coupled to each of the opposite surfaces of the upper support frame member 200, deflection of the height of the second guide rail 112SL is generated due to the weight of the carrier 90 and workpiece placed on the moving support frame member 220, and when the gap G is designed greater than the deflection amount generated maximally, the insertion guiding tapered shaft part 132 can enter smoothly the shaft inserting coupling tapered hole 144 regardless of the maximum deflection amount.

Furthermore, during entering of the lock shaft 130, the deflection amount is corrected while being raised along the tapered portion to converge to zero, so that a condition in which the carrier 90 can move over along the height-corrected rails to a next rail without a collision is satisfied.

Furthermore, as shown in FIG. 6, the side tapered surface 132ST is provided on at least one of the opposite side surfaces of the lock shaft 130, and the side tapered surface 132ST is formed to be inwardly inclined toward the longitudinal center line of the lock shaft 130 when viewed from above the lock shaft 130 and includes an inclined surface connected to the fore end of the lock shaft 130.

When the lock shaft 130 is inserted into and coupled to the shaft inserting coupling tapered hole 144 inside the lock support block 140 as the piston rod of the locking operation cylinder 120 moves forward, the lock shaft 130 can smoothly enter the shaft inserting coupling tapered hole 144 without getting caught on the fore end of the lock support block 140 by guiding of the side tapered surface 132ST. When the lock shaft 130 is inserted into and coupled to the shaft inserting coupling tapered hole 144 inside the lock support block 140, the side tapered surface 132ST securely prevents the side surface of the lock shaft 130 from getting caught on the lock support block 140, so that the lock shaft 130 can smoothly enter the shaft inserting coupling tapered hole 144 without getting caught by the fore end of the lock support block 140.

Furthermore, as shown in FIG. 8, in the present disclosure, the height of the second lift rail 112SL is provided to be relatively lower than the height of the first lift rail 112FL. The height difference indicated with D is generated.

Therefore, has a collision of the carrier 90 with the end of the second lift rail 112SL when the carrier 90 moves from the first lift rail 112FL to the second lift rail 112SL due to deflection in which the carrier 90 is in free fall due to the clearance UD that is generated between the first lift rail 112FL and the second lift rail 112SL is prevented. Accordingly, there is the effect of securely preventing damage to the carrier that may be generated when the carrier 90 collides the edge of the second lift rail 112SL due to the step difference (referring to FIG. 10).

At this point, as shown in FIG. 9, when the carrier 90 moves from the second lift rail 112SL to the first lift rail 112FL, the height of the first lift rail 112FL is provided to be relatively lower than the height of the second lift rail 112SL. The height difference indicated with D is generated.

In this case, when the carrier 90 moves from the second lift rail 112SL to the first lift rail 112FL, the gap generated between the first lift rail 112FL and the second lift rail 112SL has deflection in which the carrier 90 is in free fall due to the clearance UD to prevent the carrier 90 from colliding with the end of the first lift rail 112FL. Accordingly, there is the effect of securely preventing damage to the carrier 90 by preventing the carrier 90 from colliding with the end of the first lift rail 112FL due to the step difference.

Meanwhile, according to the present disclosure, in the carrier moving lift 110 consisting of the plurality of the first lift rails 112FL and the Z-axis rail lifters 114 lifting and lowering the second lift rail 112SL arranged to extend at the left and right ends of the first lift rail 112FL, the lock shaft 130 coupled to the locking operation device 300 moves forward by the locking operation device 300 provided at each of the left and right surfaces of each end of each of the upper and lower support frame members 200 and 210 supporting the first lift rail 112FL among the two lift rails 112FL and 112SL arranged adjacent to each other, and the lock shaft 130 is provided at each of the left and right portions of the moving support frame member 220 supporting the second lift rail 112SL, from or to which the carrier 90 moves, to be opposite to the locking operation device and is inserted into the lock support block 140 into which the lock shaft 130 is inserted and coupled to, and while the lock shaft 130 and the lock support block 140 are coupled to each other, the first lift rail 112FL and the second lift rail 112SL are securely coupled to each other so that the height difference between the first lift rail 112FL and the second lift rail 112SL is corrected, so that when the carrier moves over from the first lift rail 112FL to the second lift rail 112SL, the locking method for preventing the deflection of the carrier lift, the method being configured to prevent damage to the carrier when the carrier collides with the ends of the first lift rail 112FL and the second lift rail 112SL is provided.

The carrier moving lift locking structure according to the present disclosure is configured to add a lock unit to a upper rail, a lower rail, and a lift rail in order to prevent deflection of the lift rail 112. The upper rail is the first lift upper rail 112FLU, the lower rail is the first lift lower rail 112FLL, and the lift rail is the second lift rail 112SL. The lock unit collectively refers to all units in FIG. 4 related to the locking operation device 300, and consisting of the locking part 150 and the lock support block 140, and describing by subdivision, the lock unit consists of the locking operation cylinder 120, the lock shaft 130, the insertion guiding tapered shaft part 132, the locking support bracket 134, the locking base bracket 135, and the locking support block 140.

In the present disclosure, the upper rail, the lower rail, and the lift rail are secured by the lock unit, thereby increasing the stiffness of the lift rail moving vertically by the Z-axis rail lifters 114.

As the lift rail with weak stiffness that is supported only by the Z-axis rail lifters 114 and the upper rail and the lower rail with strong stiffness, which are securely supported without movement, are secured by the lock unit, the stiffness of the lift rail is reinforced, thereby improving the deflection of the lift rail under the weight.

In the present disclosure, the locking operation cylinder 120 of the locking part 150 is operated so that the lock shaft 130 moves forward and is fastened to the lock support block 140.

The insertion guiding tapered shaft part 132 is applied to the lock shaft 130, so that, when the first lift rail 112FL and the second lift rail 112SL are fastened to each other, the fastening is performed strong and the first lift rail 112FL and the second lift rail 112SL are coupled to each other while the step difference therebetween is corrected.

Therefore, the carrier moving lift locking structure of the present disclosure may be referred to as a locking structure of preventing the deflection of the carrier moving lift 110 such that the deflection of the first lift rail 112FL and the second lift rail 112SL under the weight of the carrier 90 are prevented by canceling the height difference between the first lift rail 112FL and the second lift rail 112SL of the carrier moving lift 110 that are connected to each other by the interaction of the locking operation cylinder 120 and the insertion guiding tapered shaft part 132 of the lock shaft 130 of the locking part 150, and the shaft inserting coupling tapered hole 144 of the lock support block 140, which are the locking operation device 30.

Specifically, the main feature of the present disclosure is to prevent the height difference between the first lift rail 112FL and the second lift rail 112SL so as to prevent the carrier 90 from colliding with the second lift rail 112SL when the carrier 90 moves over from the first lift rail 112FL of the carrier moving lift 110 to the second lift rail 112SL.

In other words, the carrier moving lift locking structure of the present disclosure is configured to prevent the collision step difference from being generated between the first lift rail 112FL and the second lift rail 112SL of the carrier moving lift 110, thereby preventing the carrier 90 from colliding with the collision step difference when the carrier 90 moves over from the first lift rail 112FL to the second lift rail 112SL and from the second lift rail 112SL to the first lift rail 112FL. Therefore, there is the effect of preventing the carrier 90 from being damaged due to an impact force of a collision during movement, and the effect of significantly improving the life of the carrier 90 can be expected as damage to the carrier 90 due to the impact force of the collision during movement is prevented.

Hereinabove, the present disclosure is not limited to the above described embodiment, and those skilled in the art will appreciate that various modifications, additions and substitutions are possible, without departing from the scope and spirit of the present disclosure.

Therefore, since the above-described embodiments are provided to completely inform those skilled in the art of the scope of the invention, the embodiments should be understood as illustrative and not limiting in all respects, and the present disclosure is defined only by the accompanying claims.

[Description for Reference numerals]

90. carrier
110. carrier moving lift
112. lift rail
112FL. first lift rail
112FLU. first lift upper rail, upper lift rail
112FLL. first lift lower rail, lower lift rail
112SL. second lift rail
114. Z-axis rail lifter
120. locking operation cylinder (locking operation part)
130. lock shaft
132. insertion guiding tapered shaft part
LC. Longitudinal center line
132UT. upper insertion guiding inclined surface
132LT. lower insertion guiding inclined surface
132ST. side tapered surface
134. locking support bracket
135. locking base bracket
140. lock support block
142. inserting hole
144. shaft inserting coupling tapered hole
144UT. upper tapered hole surface
144LT. lower tapered hole surface
144ST. side tapered hole surface
150. locking part
200. upper support frame member
210. lower support frame member
220. moving support frame member
300. locking operation device, lock unit (which is collectively referred to as all units shown in FIG. 4 about locking (referring to FIG. 4), and consists of locking part and lock support block)

UD. clearance (referring to FIG. 10)

G. gap (gap between lower portion of upper insertion guiding inclined surface and high portion of upper tapered hole surface or gap between high portion of lower insertion guiding inclined surface and lower portion of lower tapered hole surface (referring n to FIG. 4))

G1. gap (narrow portion of side tapered surface and wide portion of side tapered hole surface (referring to FIG. 6))

D. height difference between first lift rail and second lift rail (referring to FIGS. 8 and 9)

What is claimed is:

1. A carrier moving lift locking structure in a carrier moving lift comprising a plurality of first lift rails and a Z-axis rail lifter configured to lift and lower a second lift rail arranged to extend at each of left and right ends of each of the first lift rails, the carrier moving lift locking structure comprising:

a locking operation device provided at each of left and right portions of each of opposite ends of each of upper and lower support frame members supporting the plurality of first lift rails among two lift rails arranged adjacent to each other;

a lock shaft coupled to the locking operation device;

a lock support block provided at left and right portions of a moving support frame member, which is configured to support the second lift rail among the two lift rails, to be opposite to the locking operation device, such that the lock shaft is inserted thereinto, wherein, in a state in which the locking operation device is operated, the height of the second lift rail is relatively lowered than the height of each of the plurality of first lift rails.

2. The carrier moving lift locking structure of claim 1, wherein the locking operation device comprises a locking part and the lock support block, the locking part being arranged parallel to a longitudinal direction of the plurality of first lift rails and provided at each of left and right portions of opposite ends of each of the upper and lower support frame members supporting the plurality of first lift rails; and the locking part comprises a locking operation cylinder supplying a driving force allowing reciprocating movement on a locking base bracket constituting a base of the locking part, a locking support bracket coupled to a piston rod of the locking operation cylinder, and the lock shaft coupled to the locking support bracket, and the lock support block is arranged parallel to a longitudinal direction of the second lift rail, and simultaneously, is arranged at each of left and right portions of an end of the moving support frame member supporting the second lift rail to face the locking part, the end of the moving support frame member facing an end of each of the upper and lower support frame members.

3. The carrier moving lift locking structure of claim 1, wherein a shaft inserting coupling tapered hole is provided inside the lock support block by penetrating a front end of the lock support block, and as a piston rod of a locking operation cylinder moves forward and the lock shaft is inserted into and coupled to the shaft inserting coupling tapered hole inside the lock support block and each of the plurality of first lift rails and the second lift rail are firmly coupled to each other with the lock shaft and the lock support block that are coupled to each other and thus occurrence of a height difference between each of the plurality of first lift rails and the second lift rail is prevented, so that when a carrier moves over from each of the plurality of first lift rails to the second lift rail or the carrier moves over from the second lift rail to each of the plurality of first lift rails, a collision of the carrier with an end of the second lift rail or an end of each of the plurality of first lift rails is prevented, thereby preventing damage to the carrier due to the collision.

4. The carrier moving lift locking structure of claim 1, wherein the lock shaft has an upper insertion guiding inclined surface and a lower insertion guiding inclined surface that are provided at upper and lower surfaces of the lock shaft to be inclined inwardly toward a longitudinal center line when viewed from one side of the lock shaft, and the upper insertion guiding inclined surface and the lower insertion guiding inclined surface extend toward a fore end of the lock shaft such that the lock shaft is formed in a bar shape with an insertion guiding tapered shaft part at a front portion thereof, so that when a piston rod of a locking operation cylinder moves forward and the lock shaft is inserted into and coupled to a shaft inserting coupling tapered hole inside the lock support block, the lock shaft is smoothly inserted into the shaft inserting coupling tapered hole without getting caught at a fore end of the lock support block, by the insertion guiding tapered shaft part.

5. The carrier moving lift locking structure of claim 1, wherein a shaft inserting coupling tapered hole inside the lock support block has an upper tapered hole surface and a lower tapered hole surface that extend toward a fore end of the lock support block and in which a gap between the upper tapered hole surface and the lower tapered hole surface gradually widens such that the shaft inserting coupling tapered hole is provided in a tapered hole that widens to be inclined from the inside toward the fore end of the lock support block, and when a piston rod of a locking operation cylinder moves forward, an insertion guiding tapered shaft part of the lock shaft enters smoothly the shaft inserting coupling tapered hole without getting caught by the lock support block.

6. The carrier moving lift locking structure of claim 1, wherein an upper tapered hole surface and a lower tapered hole surface of a shaft inserting coupling tapered hole extend toward a fore end, and simultaneously, and there is a farthest point of the upper tapered hole surface and the lower tapered hole surface such that a distance therebetween gradually widens, and the lock shaft has an upper insertion guiding inclined surface and a lower insertion guiding inclined surface that are provided at upper and lower surfaces of the lock shaft and are inwardly inclined toward a longitudinal center line when viewed from one side of the lock shaft, and the upper insertion guiding inclined surface and the lower insertion guiding inclined surface extend to a fore end of the lock shaft, and a vertical gap (G) between the farthest point of the upper tapered hole surface and the lower tapered hole surface and a narrowest point constituting an insertion guiding tapered shaft part at a front portion of the lock shaft is formed larger than a permissible deflection amount that can occur, so that each of the plurality of first lift rails and the second lift rail are easily coupled to each other while correcting a dislocated vertical step difference.

7. The carrier moving lift locking structure of claim 1, wherein the lock shaft has a side tapered surface formed on at least one side surface among left and right side surfaces and the side tapered surface is formed to be inwardly inclined toward a longitudinal center line of the lock shaft when viewed from above the lock shaft, and the lock shaft consists of an inclined surface extending to a fore end of the lock shaft, and when a piston rod of a locking operation cylinder moves forward and the lock shaft is inserted into and coupled to a shaft inserting coupling tapered hole inside the lock support block, the lock shaft smoothly enters the shaft inserting coupling tapered hole without getting caught at a fore end of the lock support block, by guiding of the side tapered surface.

8. The carrier moving lift locking structure of claim 1, wherein a gap (G1) between a wide end of a side tapered hole surface of a shaft inserting coupling tapered hole and a narrow end of a side tapered surface of an insertion guiding tapered shaft part is formed so that coupling is smoothly performed while correcting a dislocated transverse step difference.

9. A carrier moving lift locking structure in a carrier moving lift comprising a plurality of first lift rails and a Z-axis rail lifter configured to lift and lower a second lift rail arranged to extend at each of left and right ends of each of the first lift rails, the carrier moving lift locking structure comprising:

a locking operation device provided at each of left and right portions of each of opposite ends of each of upper and lower support frame members supporting the plurality of first lift rails among two lift rails arranged adjacent to each other;

a lock shaft coupled to the locking operation device;

a lock support block provided at left and right portions of a moving support frame member, which is configured to support the second lift rail among the two lift rails, to be opposite to the locking operation device, such that the lock shaft is inserted thereinto, wherein when a carrier moves over from each of the plurality of first lift rails toward the second lift rail, in a state in which the locking operation device is operated, the height of the second lift rail is relatively lowered than the height of each of the plurality of first lift rails, so that when the carrier moves over from each of the plurality of first lift rails toward the second lift rail, a collision of the carrier with an end of the second lift rail is prevented, which may occur by falling of the carrier due to a distance that widens due to a clearance between each of the plurality of first lift rails and the second lift rail, thereby preventing the carrier from being damaged by the collision, and when the carrier moves over from the second lift rail toward each of the plurality of first lift rails, the height of each of the plurality of first lift rails is relatively lower than the height of the second lift rail, so that when the carrier moves over from the second lift rail toward each of the plurality of first lift rails, a collision of the carrier with an end of each of the plurality of first lift rails is prevented, which may occur by falling of the carrier due to a distance that widens due to the clearance between each of the plurality of first lift rails and the second lift rail, thereby preventing the carrier from being damaged by the collision.

10. The carrier moving lift locking structure of claim 9, wherein the locking operation device comprises a locking part and the lock support block, the locking part being arranged parallel to a longitudinal direction of the plurality of first lift rails and provided at each of left and right portions of opposite ends of each of the upper and lower support frame members supporting the plurality of first lift rails; and the locking part comprises a locking operation cylinder supplying a driving force allowing reciprocating movement on a locking base bracket constituting a base of the locking part, a locking support bracket coupled to a piston rod of the locking operation cylinder, and the lock shaft coupled to the locking support bracket, and the lock support block is arranged parallel to a longitudinal direction of the second lift rail, and simultaneously, is arranged at each of left and right portions of an end of the moving support frame member supporting the second lift rail to face the locking part, the end of the moving support frame member facing an end of each of the upper and lower support frame members.

11. The carrier moving lift locking structure of claim 9, wherein a shaft inserting coupling tapered hole is provided inside the lock support block by penetrating a front end of the lock support block, and as a piston rod of a locking operation cylinder moves forward and the lock shaft is inserted into and coupled to the shaft inserting coupling tapered hole inside the lock support block and each of the plurality of first lift rails and the second lift rail are firmly coupled to each other with the lock shaft and the lock support block that are coupled to each other and thus occurrence of a height difference between each of the plurality of first lift rails and the second lift rail is prevented, so that when a carrier moves over from each of the plurality of first lift rails to the second lift rail or the carrier moves over from the second lift rail to each of the plurality of first lift rails, a collision of the carrier with an end of the second lift rail or an end of each of the plurality of first lift rails is prevented, thereby preventing damage to the carrier due to the collision.

12. The carrier moving lift locking structure of claim 9, wherein the lock shaft has an upper insertion guiding inclined surface and a lower insertion guiding inclined surface that are provided at upper and lower surfaces of the lock shaft to be inclined inwardly toward a longitudinal center line when viewed from one side of the lock shaft, and the upper insertion guiding inclined surface and the lower insertion guiding inclined surface extend toward a fore end of the lock shaft such that the lock shaft is formed in a bar shape with an insertion guiding tapered shaft part at a front portion thereof, so that when a piston rod of a locking operation cylinder moves forward and the lock shaft is inserted into and coupled to a shaft inserting coupling tapered hole inside the lock support block, the lock shaft is smoothly inserted into the shaft inserting coupling tapered hole without getting caught at a fore end of the lock support block, by the insertion guiding tapered shaft part.

13. The carrier moving lift locking structure of claim 9, wherein a shaft inserting coupling tapered hole inside the lock support block has an upper tapered hole surface and a lower tapered hole surface that extend toward a fore end of the lock support block and in which a gap between the upper tapered hole surface and the lower tapered hole surface gradually widens such that the shaft inserting coupling tapered hole is provided in a tapered hole that widens to be inclined from the inside toward the fore end of the lock support block, and when a piston rod of a locking operation cylinder moves forward, an insertion guiding tapered shaft part of the lock shaft enters smoothly the shaft inserting coupling tapered hole without getting caught by the lock support block.

14. The carrier moving lift locking structure of claim 9, wherein an upper tapered hole surface and a lower tapered hole surface of a shaft inserting coupling tapered hole extend toward a fore end, and simultaneously, and there is a farthest point of the upper tapered hole surface and the lower tapered hole surface such that a distance therebetween gradually widens, and the lock shaft has an upper insertion guiding inclined surface and a lower insertion guiding inclined surface that are provided at upper and lower surfaces of the lock shaft and are inwardly inclined toward a longitudinal center line when viewed from one side of the lock shaft, and the upper insertion guiding inclined surface and the lower insertion guiding inclined surface extend to a fore end of the lock shaft, and a vertical gap (G) between the farthest point of the upper tapered hole surface and the lower tapered hole surface and a narrowest point constituting an insertion guiding tapered shaft part at a front portion of the lock shaft is formed larger than a permissible deflection amount that can occur, so that each of the plurality of first lift rails and the second lift rail are easily coupled to each other while correcting a dislocated vertical step difference.

15. The carrier moving lift locking structure of claim 9, wherein the lock shaft has a side tapered surface formed on at least one side surface among left and right side surfaces and the side tapered surface is formed to be inwardly inclined toward a longitudinal center line of the lock shaft when viewed from above the lock shaft, and the lock shaft consists of an inclined surface extending to a fore end of the lock shaft, and when a piston rod of a locking operation cylinder moves forward and the lock shaft is inserted into and coupled to a shaft inserting coupling tapered hole inside the lock support block, the lock shaft smoothly enters the shaft inserting coupling tapered hole without getting caught at a fore end of the lock support block, by guiding of the side tapered surface.

16. The carrier moving lift locking structure of claim 9, wherein a gap (G1) between a wide end of a side tapered hole surface of a shaft inserting coupling tapered hole and a narrow end of a side tapered surface of an insertion guiding tapered shaft part is formed so that coupling is smoothly performed while correcting a dislocated transverse step difference.

17. A locking method to prevent carrier moving lift deflection, the locking method being provided in a carrier moving lift consisting of a plurality of first lift rails and a Z-axis rail lifter configured to lift and lower a second lift rail arranged to extend at each of left and right ends of each of the plurality of first lift rails, and a locking operation device that is provided at each of left and right portions of each of opposite ends of each of upper and lower support frame members supporting the plurality of first lift rails, among two lift rails that are arranged adjacent to each other, allows a lock shaft coupled to the locking operation device to move forward, and the lock shaft is inserted into a lock support block, the lock support block being provided at each of left and right portions of a moving support frame member supporting the second lift rail, from or to which the carrier moves over, to face the locking operation device such that the lock shaft is inserted and coupled thereto, and in a state in which the lock shaft and the lock support block are coupled to each other, each of the plurality of first lift rails and the second lift rail are firmly coupled to each other to correct a height difference between each of the first lift rails and the second lift rail, so that when the carrier moves over from each of the first lift rails toward the second lift rail and from the second lift rail toward each of the first lift rails, damage to the carrier due to a collision with ends of each of the first lift rails and the second lift rail is prevented, wherein, in a state in which the locking operation device is operated, the height of the second lift rail is relatively lowered than the height of each of the plurality of first lift rails.

* * * * *